United States Patent
Kataoka

(10) Patent No.: US 6,471,449 B1
(45) Date of Patent: Oct. 29, 2002

(54) THROW-AWAY TIP WITH ABRASION SENSOR

(75) Inventor: Hideaki Kataoka, Kyoto (JP)

(73) Assignee: Kyocera Corporation, Kyoto (JP)

( * ) Notice: Subject to any disclaimer, the term of this patent is extended or adjusted under 35 U.S.C. 154(b) by 75 days.

(21) Appl. No.: 09/613,959

(22) Filed: Jul. 11, 2000

(30) Foreign Application Priority Data

| Oct. 28, 1999 | (JP) | 11-307621 |
| Oct. 28, 1999 | (JP) | 11-307622 |
| Oct. 28, 1999 | (JP) | 11-307623 |

(51) Int. Cl.⁷ .......................... B23B 27/00; B23B 29/00
(52) U.S. Cl. ..................... 407/119; 120/118
(58) Field of Search ................ 407/120, 119, 407/113, 114, 115, 116, 117, 118

(56) References Cited

U.S. PATENT DOCUMENTS 4,559,600 A * 12/1985 Rao ........................ 364/474
5,864,241 A * 1/1999 Schreck et al. ............. 324/699

FOREIGN PATENT DOCUMENTS

| JP | 48-40326 | 6/1973 |
| JP | 62-88552 | 4/1987 |
| JP | 3-120323 | 12/1991 |
| JP | 9-038846 | 2/1997 |

OTHER PUBLICATIONS

H. König, et al., "Verschleißerkennung an Drehwerkzugen", pp. 523–526.
A. J. Pekelharing, et al., "When does the cutting tool crack?", Delft University of Technology, pp. 8–11.
Hideki Aoyama, et al., "A study on a throw away tool equipped with a sensor to detect flank wear", pp. 80–85.

* cited by examiner

Primary Examiner—Henry Tsai
(74) Attorney, Agent, or Firm—Hogan & Hartson, L.L.P.

(57) ABSTRACT

A throw-away tip according to the present invention has a plurality of cutting corner portions. The corner portions are each provided with a sensor line surrounding the corner portion and a return line extending parallel to the sensor line. The procision of the return line makes it possible to provide connection portions connected to a pair of connection lines on one of the adjacent flanks on the corner portion. Therefore, the connection lines can be provided in a spaced parallel relation on the same flank. The area of a region surrounded by a pair of contact regions, the pair of connection lines, the return line and the sensor line is reduced, so that circuits for plurality of sensor lines can properly be arranged on the surface of a base of the throw-away tip.

15 Claims, 7 Drawing Sheets

THROW-AWAY TIP WITH ABRASION SENSOR

This application is based on application Nos. 11-307621, 11-307622 and 11-307623 filed in Japan, the contents of which are incorporated herein by reference.

BACKGROUND OF THE INVENTION

1. Field of the Invention

The present invention relates to a throw-away tip for use in a cutting process.

2. Description of Related Art

Throw-away tips are known which are adapted to be attached to a holder or the like to function as a cutting tool. Such a throw-away tip is a disposable tip which is changed, rather than polished for reuse, when its cutting edge is worn out. The throw-away tip has cutting ridges provided on respective corners of a generally planar rectangular or triangular base. When one of the corner cutting ridges is worn out, another of the corner cutting ridges is used. Then, the throw-away tip is changed when all the corner cutting ridges are worn out.

However, it is not easy to check how far the cutting ridges of the throw-away tip have been worn. In view of an operating environment, it is particularly difficult to detect the abrasion degree of a cutting ridge currently used for cutting without interrupting the cutting process.

Conventional methods for detecting the abrasion degree of the cutting ridge are as follows:

(1) The cutting process is interrupted, and the throw-away tip is removed from the holder to be observed the cutting ridge by means of a tool microscope or the like.

(2) The abrasion degree of the cutting ridge is estimated by detecting a phenomenon incidental to the abrasion of the cutting ridge. For example, a reduction in cutting ability, an increase in vibration, occurrence of a noise, or the like is detected by a sensor disposed adjacent a working portion on a machine tool, and the A-estimation of the abrasion degree is based on a detection signal from the sensor.

In the method (1), however, the cutting process is interrupted, and the abrasion degree of the cutting ridge cannot quantitatively be determined, so that the abrasion detection cannot accurately be performed.

The method (2) requires a complicated detector, and is less reliable with a poor sensitivity for the detection of the abrasion degree.

One approach to these problems is described in Japanese Unexamined Utility Model Publication No. 3-120323 (1991). This publication discloses a throw-away tip having a sensor line of a conductive film provided along a cutting ridge on a flank thereof. It is also disclosed that the sensor line has a width conforming to an allowable abrasion width. In accordance with the throw-away tip disclosed in the publication, the sensor line is worn as the cutting ridge is worn, so that expiration of the life of the cutting ridge can be detected when the sensor line is cut off.

Further, Japanese Unexamined Patent Publication No. 9-38846 (1997) proposes an ordinary cutting tool (not a throw-away tip) which has a thin film circuit on a flank thereof, wherein expiration of the life of the cutting tool is automatically detected by sensing a change in electrical resistance which occurs due to abrasion of the thin film circuit as the flank is worn.

The provision of the sensor line of the conductive film along the cutting ridge on the flank for the detection of the change in the line resistance is preferable for the detection of the abrasion of the cutting ridge.

Where this approach is applied to the throw-away tip, however, it is difficult in practice to connect the sensor line provided along the cutting ridge to an external detection circuit and the like.

More specifically, the throw-away tip is a disposable tip as described above, and is very small with a size of less than 1 $cm^3$. During the cutting process, the tip in operation is exposed to a cutting fluid (water or oil) and shavings. However, no technique has been established for connecting the sensor line formed on the small throw-away tip to the external detection circuit and the like without any trouble in such a machining environment.

SUMMARY OF THE INVENTION

The present invention is to provide a throw-away tip having an abrasion sensor which serves for practical implementation to solve the aforesaid problems.

It is a principal object of the present invention to provide a throw-away tip having an abrasion sensor which, when attached to a holder or the like, ensures electrical connection between a sensor line provided thereon and an external circuit without any trouble in a cutting process.

It is another object of the invention to provide a throw-away tip which features protection of a connection portion between a sensor line provided thereon and an external circuit.

In accordance with the present invention, there is provided a throw-away tip with an abrasion sensor, which includes: a generally planar base having a rake face defined by one of opposite surfaces thereof, a seat face defined by the other surface thereof opposite from the rake face, and a flank defined by a side face thereof intersecting the rake face and the seat face; and a cutting ridge defined by an intersection between the rake face and the flank, the throw-away tip comprising: a sensor line of a conductive film provided along the cutting ridge on the flank in an electrically insulative relation with respect to the base; a pair of contact regions provided on the seat face in an electrically insulative relation with respect to the base, the contact regions being electrically connectable to a predetermined circuit; and a pair of connection lines provided on the base in an electrically insulative relation with respect to the base and respectively connecting the pair of contact regions to opposite ends of the sensor line, one of the pair of connection lines including a return line spaced a predetermined distance from the sensor line in a parallel relation to the sensor line.

With this arrangement, the provision of the return line extending parallel to the sensor line reduces the area of a region surrounded by an electrical conduction path including the pair of contact regions, the pair of connection lines and the sensor line. Therefore, even if the base has a small surface area, particularly with a small side face or a small flank, the electrical conduction path can properly be provided.

Particularly, where the throw-away tip has a plurality of cutting corner portions and sensor lines provided for the respective corner portions, connection lines for connection to the sensor lines can be arranged in a smaller space.

The connection lines may each have a greater width than the sensor line.

The connection lines which have a greater width than the sensor line have a lower electrical resistance than the sensor line. At detection of a change in the resistance of the sensor line, the resistance of the connection line is relatively low and, therefore, hardly influences the change in the sensor line resistance. As a result, the change in the sensor line resistance can accurately be detected.

It is preferable that the base has a plurality of side faces, which respectively define flanks, and a cutting corner portion is defined by an intersection between the rake face and each adjacent pair of flanks. Preferably, the sensor line extends along the cutting ridge as surrounding the corner portion and the return line extends parallel to the sensor line as surrounding the corner portion.

The return line surrounds the corner portion in a parallel relation to the sensor line which also surrounds the corner portion. Therefore, one end of the sensor line and an end of the return line extending from the other end of the sensor line toward the one end of the sensor line can be located on one of the adjacent pair of flanks. Thus, the pair of connection lines respectively connected to the sensor line and the return line can be provided in a spaced and parallel relation on the same flank. Further, the provision of the connection lines requires a smaller space, so that connection lines for the plurality of sensor lines can be provided on the single flank.

The pair of connection lines except the return line preferably extend parallel to each other at a predetermined inclination angle with respect to the sensor line on the flank.

With the connection lines provided parallel to each other at the predetermined inclination angle with respect to the sensor line, connection lines for the plurality of sensor lines can easily be provided on the flank.

The throw-away tip may include a plurality of cutting corner portions, a plurality of sensor lines for the respective cutting corner portions, plural pairs of connection lines connected to the respective sensor lines, and plural pairs of contact regions, wherein electrical conduction paths including the sensor lines, the pairs of connection lines and the pairs of contact regions are arranged in the same pattern.

By arranging the respective electrical conduction paths including the sensor lines, the pairs of connection lines and the pairs of contact regions in the same pattern, a patterning process can easily be performed, thereby advantageously reducing the production costs.

In accordance with another aspect of the invention, there is provided a throw-away tip with an abrasion sensor, which includes: a generally planar base having a rake face defined by one of opposite surfaces thereof, a seat face defined by the other surface thereof opposite from the rake face, and a flank defined by a side face thereof intersecting the rake face and the seat face; and a cutting ridge defined by an intersection between the rake face and the flank, the throw-away tip comprising: a sensor line of a conductive film provided along the cutting ridge on the flank in an electrically insulative relation with respect to the base; a pair of contact regions provided on the seat face in an electrically insulative relation with respect to the base, the contact regions being electrically connectable to a predetermined circuit; and a pair of connection lines provided on the base in an electrically insulative relation with respect to the base and respectively connecting the pair of contact regions to opposite ends of the sensor line.

The sensor line provided on the throw-away tip is adapted to be connected to probes provided on a tip seat of a holder when the throw-away tip is attached to the holder. The probes extend through the inside of the holder and are connected to an external detection circuit and a judgment circuit.

The tip seat of the holder is adapted to receive the seat face of the throw-away tip brought into abutment or intimate contact therewith. The seat face of the throw-away tip abutting against the tip seat is not exposed to the outside thereby to be directly subjected neither to a cutting fluid (water or oil) nor to slugs. Since the contact regions electrically connectable to the external circuit are provided on the seat face of the throw-away tip, the contact between the contact regions and distal ends of the probes provided on the tip seat can be protected from the cutting fluid and the slugs.

Further, since the probes to be electrically connected to the respective contact regions of the throw-away tip are provided on the tip seat, the probes can be disposed within the holder. Therefore, the electrical connection portions provided on the holder are not exposed from the holder thereby to be affected neither by the cutting fluid nor by the slugs.

Thus, a structure for properly connecting the sensor line of the throw-away tip to the external circuit can be realized. As a result, the expiration of the life of the throw-away tip can accurately be detected with the use of the sensor line.

A side edge of the sensor line away from the cutting ridge preferably extends parallel to the cutting ridge and is spaced from the cutting ridge by a distance predetermined in relation to abrasion of the flank.

With this arrangement, the abrasion of the cutting ridge is related to the cut-off of the conduction of the sensor line, so that a predetermined abrasion state of the cutting ridge can be detected when the conduction of the sensor line is cut off.

The predetermined distance preferably conforms to the life of the cutting ridge which is expired by abrasion of the flank. The expiration of the life of the cutting ridge can be detected when the conduction of the sensor line is cut off.

The base is composed of an insulative material with its surface almost entirely covered with a conductive film, and the sensor line, the connection lines and the contact regions are formed by electrically separating the conductive film on the surface. Alternatively, the base is composed of a conductive material with its surface almost entirely covered with a nonconductive film on which a conductive film is provided, and the sensor line, the connection lines and the contact regions are formed by electrically separating the conductive film on the surface.

The electrical insulation of the sensor line, the contact regions and the connection lines can be achieved by the former method where the base is of the insulative material. Where the base is of the conductive material, the electrical insulation can be achieved by the latter method, in which the surface of the base is covered with the nonconductive film on which the conductive film is formed.

The electrical separation of the sensor line, the connection lines and the contact regions from the conductive film on the surface of the base can be achieved by laser machining. The laser machining ensures a high level of machining accuracy and a high level of flexibility in changing a circuit design.

In accordance with further another aspect of the invention, there is provided a throw-away tip with an abrasion sensor, which includes: a generally planar base having a rake face defined by one of opposite surfaces thereof, a seat face defined by the other surface thereof opposite from the rake face, and a plurality of flanks defined by a plurality of side faces thereof intersecting the rake face and the seat face; a plurality of cutting ridges respectively defined by intersections between the rake face and the flanks; and N cutting corner portions (N: a natural number not smaller than two) each defined by an intersection between the rake face and an adjacent pair of flanks, the throw-away tip comprising: sensor lines of a conductive film respectively provided along the cutting ridges on the N corner portions in an electrically insulative relation with respect to the base to surround the corner portions; N pairs of contact regions provided on the seat face in an electrically insulative relation with respect to the base, the contact regions being electrically connectable to a predetermined circuit; and N pairs of connection lines provided on the base in an electrically insulative relation with respect to the base and respectively connecting the N pairs of contact regions to opposite ends of the sensor lines on the N corner portions.

The throw-away tip has N cutting corner portions on at least one side thereof. The sensor lines for detection of abrasion of the cutting ridges are respectively provided on the N corner portions. The N pairs of contact regions are provided on the seat face for the respective sensor lines. When any one of the corner portions is used for cutting, a pair of contact regions for a sensor line on the currently used corner portion can electrically be connected to probes or the like provided in a holder or the like.

Whichever of the corner portions is used, the abrasion of the cutting ridge on the currently used corner portion can accurately be detected.

The throw-away tip may be a double-sided tip such that, where one of the opposite surfaces of the base serves as the rake face, the other surface serves as the seat face and, where the other surface serves as the rake face, the one surface serves as the seat face. The N corner portions are provided on each of opposite sides of the base, and the N pairs of contact regions are provided on each of the opposite surfaces.

In this case, either side of the throw-away tip can be used, so that the number of the cutting corner portions can be increased. Whichever of the corner portions is used, the abrasion of the corresponding cutting ridge can properly be detected.

It is preferable that one of the contact regions in each of the N pairs is electrically isolated while the other contact regions in the N respective pairs are electrically connected together.

The one contact region in each of the N pairs is a region to which a predetermined voltage is applied from a detection circuit or the like, while the other contact region is a region connected to a ground potential. Therefore, the other contact regions in the N respective pairs serve as common earth regions electrically connected together. Such a configuration of the contact regions is advantageous in that the contact regions can be arranged in a simplified pattern and formed by an easier working process.

The N pairs of contact regions on the one surface of the throw-away tip and the N pairs of contact regions on the other surface are preferably arranged in the same configuration.

It is preferable that the connection lines extend over the flanks and the seat face, and portions of the connection lines on the flanks are inclined at a predetermined inclination angle with respect to the sensor lines.

Since the N pairs of contact regions on the one surface and the N pairs of contact regions on the other surface are arranged in the same configuration, the contact regions on a surface of the base functioning as the seat face can properly be brought into contact with the probes of the detection circuit, whichever surface serves as the rake face.

Where the throw-away tip is adapted for the double-sided use, the N pairs of contact regions are provided on each of the opposite surfaces thereof. The connection lines for connection between the sensor lines and the contact regions should be provided on the respective flanks, since the flanks each have a limited area. Therefore, where the connection lines for connection to the contact regions on the one surface and the connection lines for connection to the contact regions on the other surface are to be provided on the flanks, it is preferable in consideration of the arrangement of the connection lines that the connection lines are inclined with respect to the sensor lines. Thus, the sensor lines and the connection lines can compactly be arranged on the flanks.

The connection lines are preferably arranged symmetrically about the center of each of the flanks. The symmetrical positional relationship of the connection lines about the center of the flank ensures more compact line arrangement.

DESCRIPTION OF THE PREFERRED EMBODIMENTS

Figure 1A:
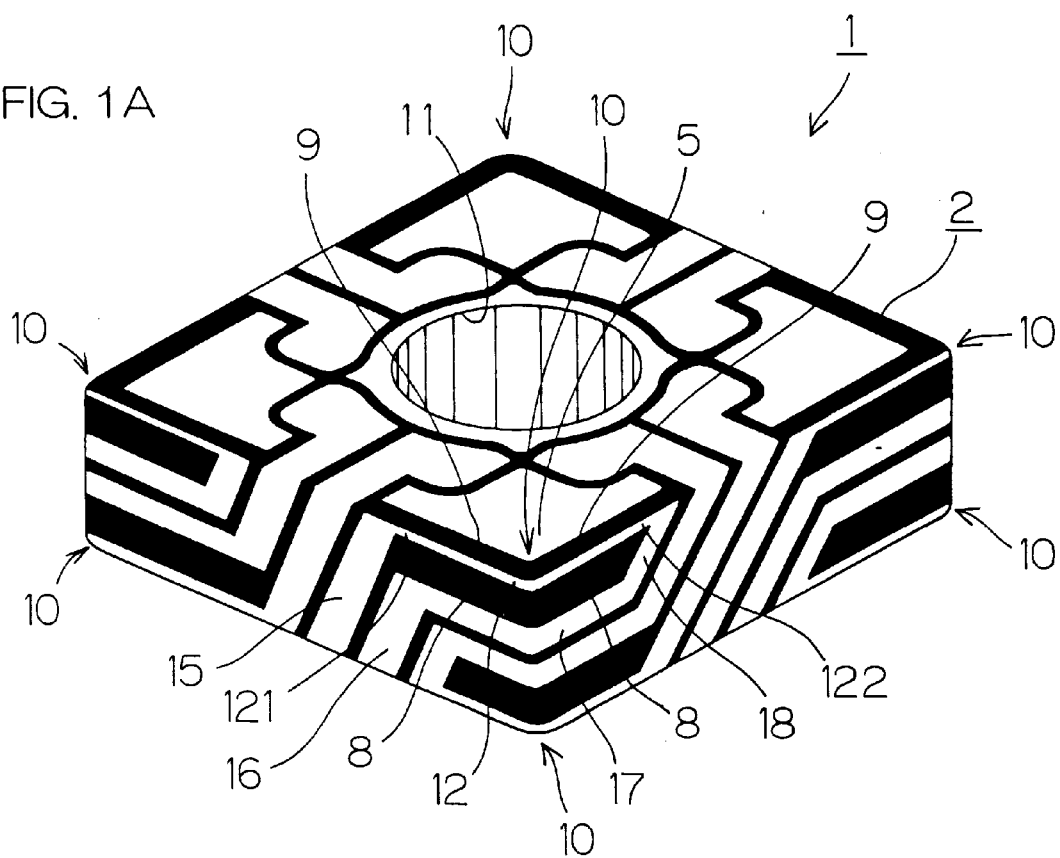
FIG. 1A is a perspective view of a throw-away tip according to one embodiment of the present invention as viewed from the upper forward side thereof.
Figure 1B:
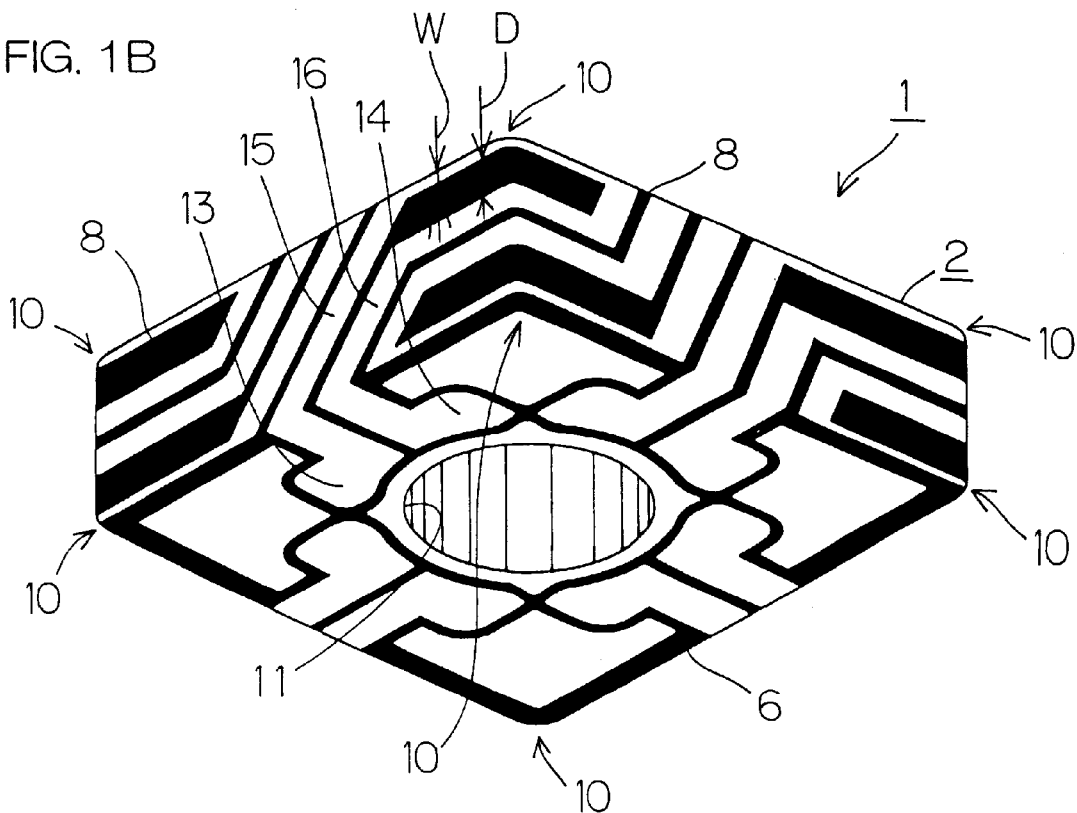
FIG. 1B is a perspective view of the throw-away tip as viewed from the lower forward side thereof.

FIG. 1A is a perspective view of a throw-away tip 1 according to one embodiment of the present invention as viewed from the upper forward side thereof, and FIG. 1B is a perspective view of the throw-away tip 1 as viewed from the lower forward side thereof. The throw-away tip 1 has a generally planar (rectangular column-shaped) base 2. For convenience of explanation, one of opposite surfaces of the base 2 is called "upper surface" and the other surface is called "lower surface", though the base 2 has no distinction between the upper and lower sides thereof.

The upper surface of the base 2 defines a rake face 5, and the lower surface of the base 2 defines a seat face 6. Four side surfaces of the base 2 respectively define flanks 8. Intersections between the rake face 5 and the respective flanks 8 define cutting ridges 9. Further, a cutting corner portion 10 is defined by an intersection between the rake face 5 and each two adjacent flanks 8.

A clamp hole 11 is formed in the center of the base 2 as extending from the upper surface to the lower surface. The throw-away tip 1 is positioned in a tip pocket of a predetermined holder and attached to the holder with the clamp hole 11 being in threading engagement with a clamp screw. With the throw-away tip thus attached, an upper forward corner portion 10 in FIG. 1A, for example, is used for cutting. By loosening the clamp screw and turning the throw-away tip 1 by 90 degrees about the clamp hole 11, another corner portion 10 can be used for cutting. By thus turning the throw-away tip 1 by 90 degrees at a time, the four corner portions 10 on the upper side can successively be used for cutting.

Further, by attaching the throw-away tip 1 to the holder in a vertically inverted manner, four corner portions on the lower side as seen in FIGS. 1A and 1B can successively be used for cutting. When any of the corner portions o th lowe sid isused, th uppe surface serves as the seat face and the lower surface serves as the rake face. Thus, the eight corner portions 10 of the rectangular column-shaped base 2 of the throw-away tip 1 can respectively be used for cutting.

A sensor line 12 of a conductive film is provided on each of the eight corner portions 10 as extending along the cutting ridge 9.

The sensor lines 12 are provided on the flanks 8. More specifically, the sensor line 12 is provided on each adjacent pair of flanks 8 defining the corner portion 10 as extending along the cutting ridge 9 to surround the corner portion 10. The sensor line 12 is a conductive film line of a width W extending along the cutting ridge 9 with an upper edge thereof contacting the cutting ridge 9. The sensor line 12 is electrically insulated from the base 2.

The width W of the sensor line 12 conforms to a reference life of the corner portions 10 (an allowable abrasion limit of the flanks 8). The allowable abrasion limit for the reference life of the corner portions 10 of the throw-away tip 1 of this type is within the range of 0.05 to 0.7 mm, so that the width W of the sensor line 12 is set at a value within this range.

Where the allowable abrasion limit of the flanks 8 of the throw-away tip 1 is 0.2 mm at the expiration of the life thereof, the sensor line 12 has a width W of 0.2 mm. When a cutting process with the use of the corner portion 10 is in progress, the cutting ridge 9 and the flanks 8 are abraded as the machining time increases. The abrasion of the flanks 8 causes the sensor line 12 to be correspondingly abraded. When the abrasion width of the flanks 8 exceeds the allowable abrasion limit for the reference life, the sensor line 12 having the width W conforming to the reference life is cut off by the abrasion. Since the resistance of the sensor line 12 is measured at its opposite ends by an external circuit as will be described later, the expiration of the life of the cutting ridge 9 of the corner portion 10 is detected when the resistance of the sensor line 12 becomes infinite.

As shown in FIG. 1B, pairs of contact regions 13, 14 are provided on the seat face 6. The pairs of contact regions 13, 14 are composed of a conductive film, and insulated from the base 2. The contact regions 13, 14 are electrically connectable to an external resistance detection circuit, for example, provided outside the holder. As will be described later, the contact regions 13, 14 in each pair are electrically connected to probes of the detection circuit provided on a tip seat of the holder when the throw-away tip 1 is attached to the holder. The contact regions 13, 14 preferably have as great areas as possible for easy connection to the probes of the detection circuit.

Pairs of connection lines 15, 16 of a conductive film are provided in an electrically insulative relation with respect to the base 2 as extending from the flanks 8 to the seat face 6 of the base 2. The connection line 15 in each pair electrically connects one end 121 of the sensor line 12 to one 13 of the contact regions, while the connection line 16 in each pair electrically connects the other end 122 of the sensor line 12 to the other contact region 14. The connection lines 15, 16 each have a width sufficiently greater than the width W of the sensor line 12 thereby to have an electrical resistance sufficiently lower than the electrical resistance of the sensor line 12. Therefore, the connection lines 15, 16 do not affect the detection of a change in the electrical resistance of the sensor line.

The connection line 16 connected to the other end 122 of the sensor line 12 includes a return line 17 as a part thereof. The return line 17 is connected to the other end 122 of the sensor line 12 at a return portion 18 thereof. The return line 17 is spaced a predetermined distance D from the sensor line 12 in a parallel relation to the sensor line 12. The provision of the return line 17 as a part of the connection line 16 makes it possible to arrange the connection lines 15, 16 in a parallel and spaced relation on the flanks 8, so that the connection lines 15, 16 can advantageously be arranged in a highly area-efficient manner.

The distance D between the sensor line 12 and the return line 17 is not less than 0.05 mm, and preferably as great as possible within an allowable range. In the cutting process with the use of the corner portion 10, a workpiece is cut by the cutting ridge 9 of the corner portion 10. A slug of the workpiece is generated in a direction from the rake face 5 toward the flanks 8 while being curled, for example. If the removed slug adheres between the sensor line 12 and the return line 17, these lines may electrically be shorted.

Therefore, the distance D between the sensor line 12 and the return line 17 is set as great as possible to prevent the electrical shorting between the lines 15 and 16 due to the adhesion of the slug.

The pair of connection lines 15, 16 formed on the flanks 8 are inclined at a predetermined inclination angle with respect to the sensor line 12 (or the cutting ridge 9), rather than extend perpendicularly to the sensor line. This is because the contact regions 13, 14 provided on the seat face 6 on the lower surface and the contact regions 13, 14 provided on the upper surface are preferably arranged in the same pattern.

More specifically, the four corner portions 10 on the upper side as viewed in FIG. 1A are turned by 90 degrees so as to be successively used for cutting. The 90-degree turning of the throw-away tip 1 turns the four pairs of contact regions 13, 14 in FIG. 1B by 90 degrees. Then, the contact regions 13, 14 connected to the sensor line 12 of the corner portion 10 to be used for cutting are connected to the probes of the external circuit. Therefore, the four pairs of the contact regions 13, 14 are symmetrically arranged in a 90-degree angularly spaced relation about the center of the seat face 6.

Since the throw-away tip 1 can be used upside down, the four pairs of contact regions 13, 14 provided on the upper surface as seen in FIG. 1A are symmetrically arranged in a 90-degree angularly spaced relation about the center of the upper surface. In order to arrange the contact regions 13, 14 on the upper surface and the contact regions 13, 14 on the lower face in the same pattern, it is necessary to obliquely arrange the connection lines 15, 16 on the flanks 8.

Where the throw-away tip is of a so-call positive type in which the corner portions only on one side (e.g., upper side) of the base are used for cutting, there may be no need to obliquely arrange the connection lines 15, 16 on the flanks 8.

Figure 2:
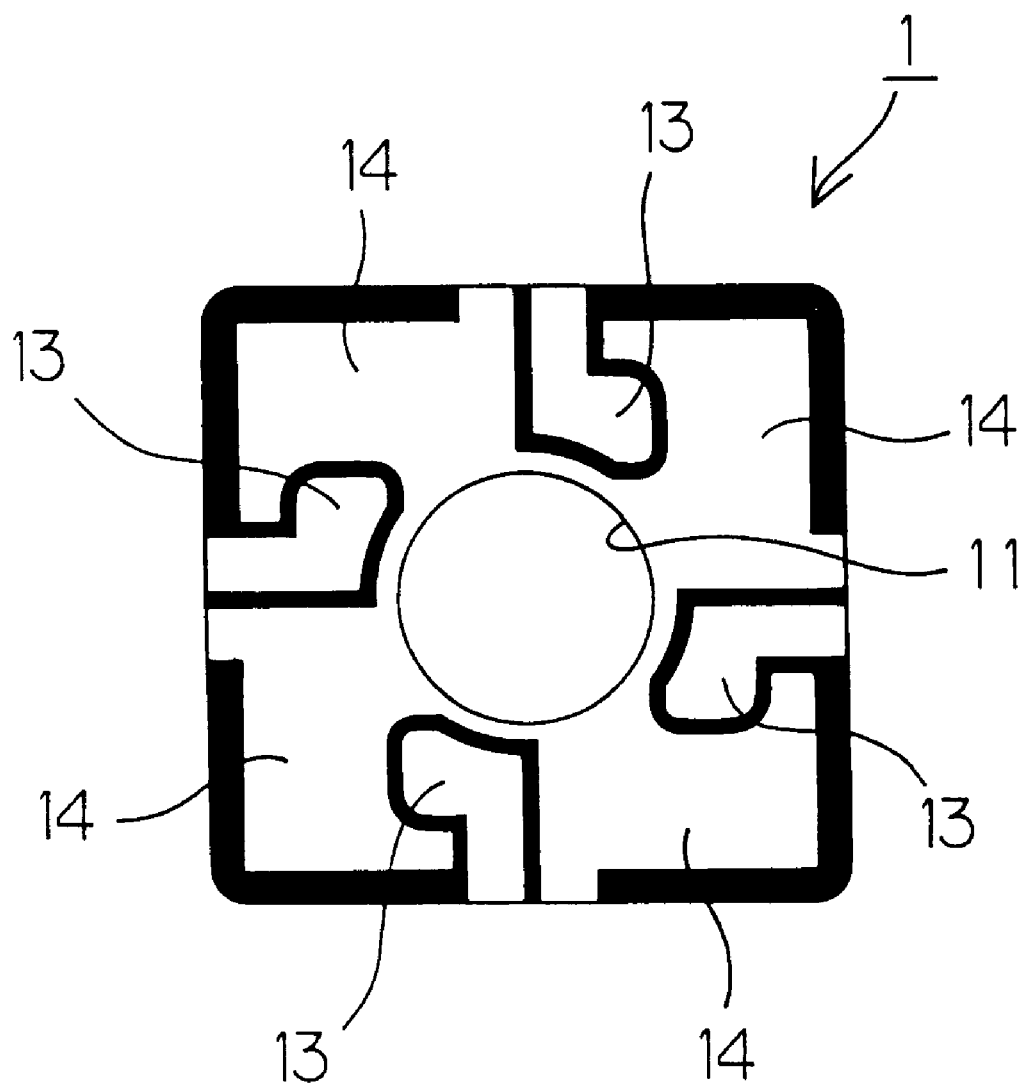
FIG. 2 is a plan view illustrating a modification of the arrangement of four pairs of contact regions provided on a seat face of the throw-away tip.

FIG. 2 is a plan view illustrating a modification of the arrangement of the four pairs of contact regions 13, 14 provided on the seat face 6 of the throw-away tip 1. The four pairs of contact regions 13, 14 are provided on the seat face 6 and, when one of the corner portions is used for cutting, a corresponding pair of contact regions are brought into contact with the probes of the external circuit.

When the electrical resistance of the sensor line 12 is measured with the contact regions 13, 14 connected to the external circuit, a predetermined voltage is applied to the one contact region 13 from the external circuit, and the other contact region 14 is connected to the ground potential in the external circuit. Whichever of the pairs of contact regions 13, 14 are used, the other contact region 14 is connected to the ground potential. Therefore, the contact regions 14 in the four respective pairs may be employed as a ground potential region thereby to be electrically connected together. This arrangement is shown in FIG. 2.

This arrangement of the contact regions advantageously reduces the laser machining time which is required when an electrical conduction film formed on the entire seat face 6 is laser-machined for formation of the contact regions 13, 14 and the connection lines 15, 16. This is because the area of the conductive film to be removed by the laser-machining is small.

Figure 3:
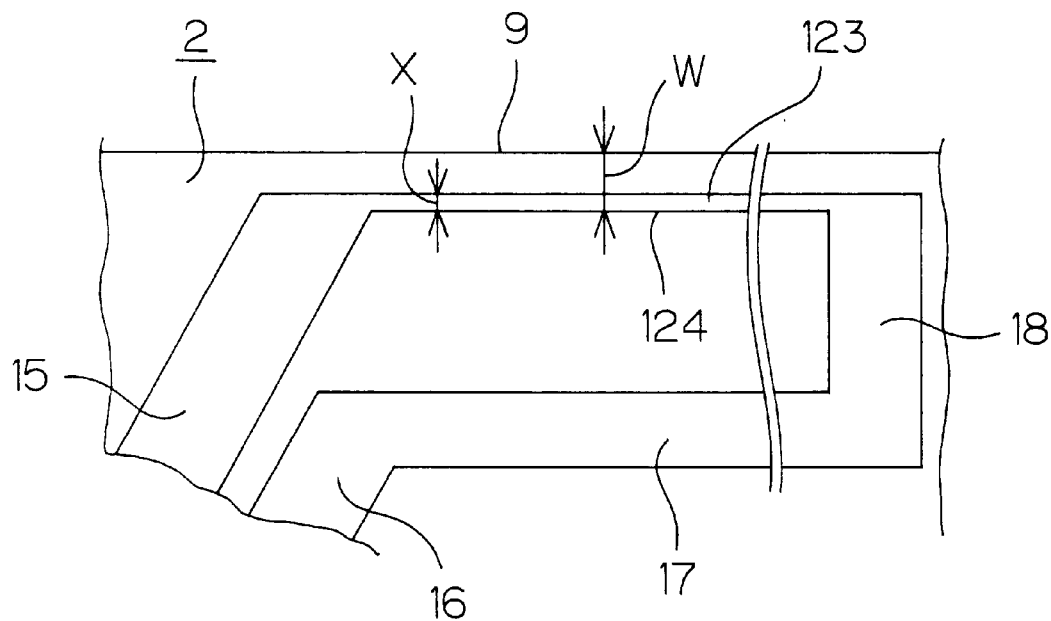
FIG. 3 is a perspective view illustrating a sensor line according to another embodiment.

FIG. 3 is a perspective view illustrating a sensor line according to another embodiment. The sensor line 12 described with reference to FIG. 1 has the width W and extends parallel to the cutting ridge 9 as surrounding the corner portion 10 with its upper edge contacting the cutting ridge 9. On the contrary, the sensor line 123 shown in FIG. 3 has a width X (W>X) which is smaller than the width of the sensor line 12. Like the sensor line 12, the sensor line 123 is composed of a conductive film and insulated from the base 2. The sensor line 123 extends parallel to the cutting ridge 9 so that a distance between the cutting ridge 9 and a lower edge of the sensor line 123, i.e., an edge 124 thereof away from the cutting ridge 9, equals to a distance W.

Like the width W of the sensor line 12 in FIG. 1, the distance W conforms to the reference life of the flanks 8. The flanks 8 are abraded from the cutting ridge 9 with time in the use of the cutting ridge 9. When the abrasion reaches the sensor line 123 and exceeds the lower edge 124 thereof, the sensor line 123 is cut off by the abrasion.

The sensor line 123 may be thus configured so that the edge (lower edge) 124 thereof away from the cutting ridge 9 is spaced the predetermined distance W from the cutting ridge 9.

Figure 4:
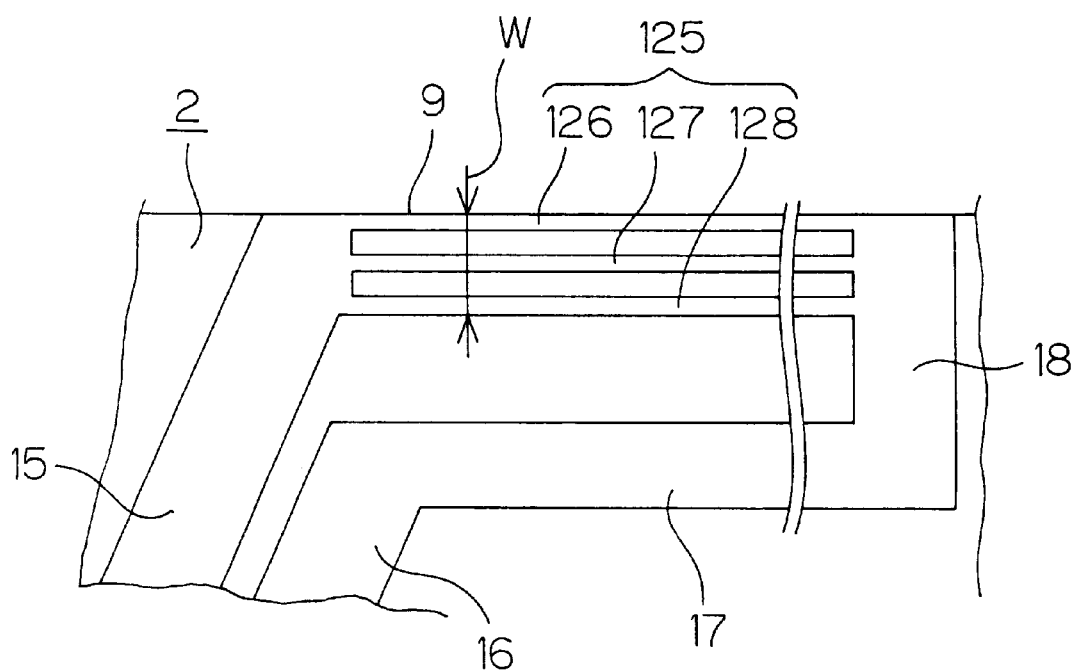
FIG. 4 is a perspective view illustrating a sensor line according to further another embodiment.

FIG. 4 is a perspective view illustrating a sensor line according to further another embodiment. The sensor line 125 shown in FIG. 4 includes a plurality of lines, e.g., three lines 126, 127, 128 extending parallel to each other. A distance between the cutting ridge 9 and a lower edge of the line 128 remotest from the cutting ridge 9 is W, which is equal to the width W of the sensor line 12 in FIG. 1.

Since the sensor line 125 is constituted by the plurality of lines 126, 127, 128 extending parallel to each other, the lines are cut off in the order of increasing distance from the cutting ridge 9 by the abrasion as the abrasion of the flanks 8 proceeds. Therefore, how far the cutting ridge 9 on the corner portion 10 currently used for cutting is abraded can be detected stepwise.

The foregoing explanation with reference to FIGS. 1, 3 and 4 is directed to the cases where the distance W from the cutting ridge 9 to the lower edge of the sensor line conforms with the reference life of the corner portion 10 (or the allowable abrasion limit of the flanks 8).

However, the distance W is not necessarily equal to the allowable abrasion limit of the flanks 8, but may be a value associated with the abrasion of the flanks 8. In the case of a preliminary (rough) cutting process or a standard cutting process, for example, the allowable abrasion limit of the flanks 8 is relatively great. In the case of a finish cutting process, on the contrary, the throw-away tip has to be changed when the flanks 8 are abraded to a certain extent. To deal with this case, the distance W may be determined so as to detect an abrasion degree at which the throw-away tip is usable but not suitable for the finish cutting process.

Figure 5:
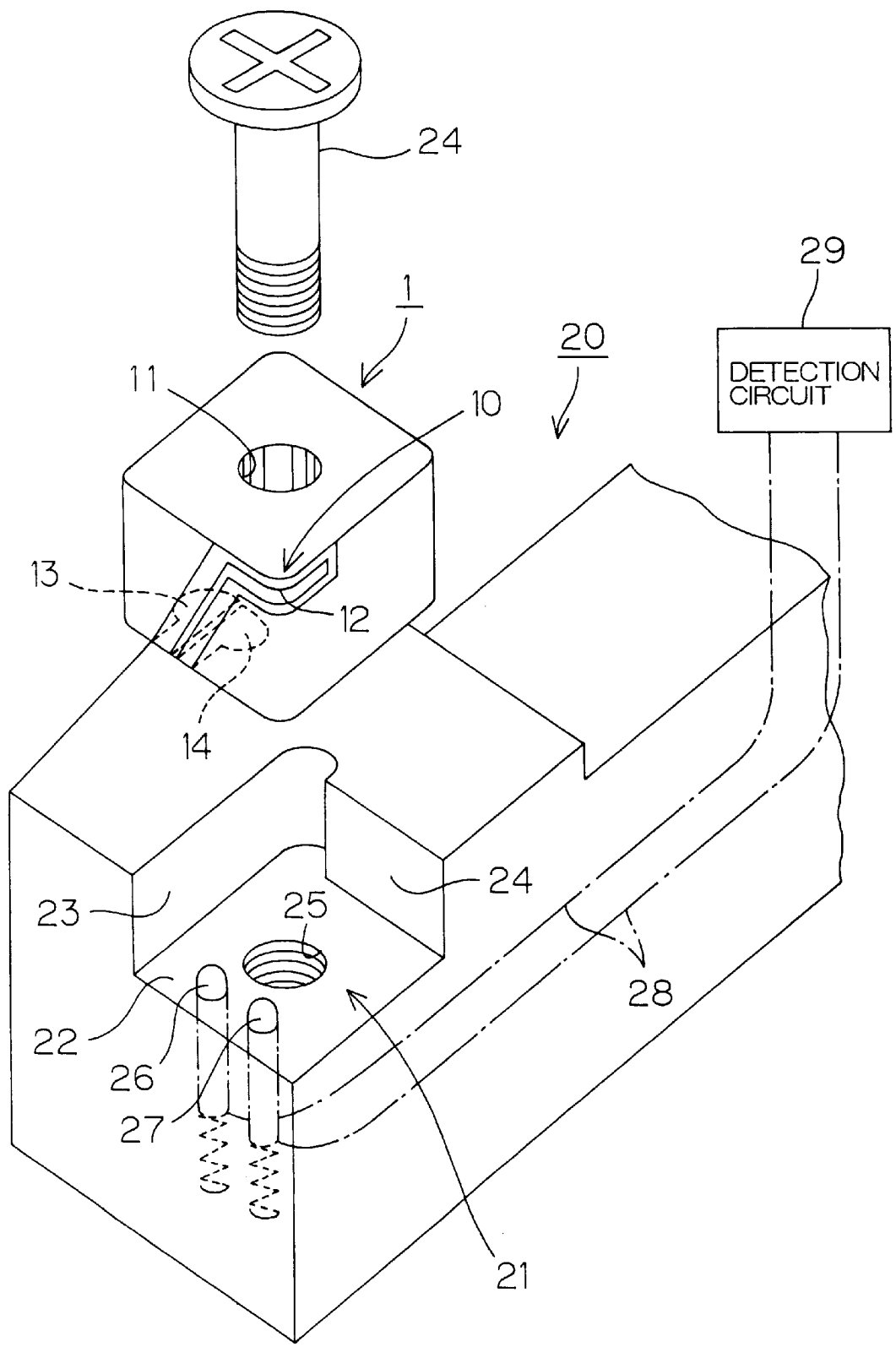
FIG. 5 is a schematic perspective view illustrating the throw-away tip of the one embodiment which is about to be attached to a holder.

FIG. 5 is a schematic perspective view illustrating the throw-away tip 1 shown in FIGS. 1A and 1B, which is about to be attached to a holder.

A tip attachment pocket 21 is provided in a distal end portion of the holder 20. A bottom surface of the pocket 21 serves as a tip seat 22. Side walls of the pocket 21 are adapted to abut against side faces of the tip to serve as restriction faces 23 for restricting the tip. The throw-away tip 1 is accommodated in the pocket 21 with the seat face 6 thereof abutting against the tip seat 22 and with the side faces abutting against the restriction faces 23. A clamp screw 24 is inserted into the clamp hole 11 of the throw-away tip 1 from the upper side, and a distal end portion of the clamp screw is brought into threading engagement with a screw hole 25 formed in the center of the tip seat 22. Thus, the throw-away tip 1 is attached to the holder 20.

A pair of probes 26, 27 project from the tip seat 22 in positions opposed to the contact regions 13, 14 connected to the sensor line 12 of the corner portion 10 of the attached throw-away tip 1 to be used for cutting. The probes 26, 27 are resiliently biased upward to project from the tip seat 22, for example, by several millimeters. When the throw-away tip 1 is mounted in the pocket 21, the probes 26, 27 are pressed down by the seat face 6 of the throw-away tip 1, so that the upper ends of the probes are flush with the tip seat 22. Thus, the upper ends of the probes 26, 27 are brought into electrical contact with the contact regions 13, 14, respectively, on the seat face 6 of the throw-away tip 1.

The probes 26, 27 are connected to lead wires 28 provided in the holder 20 as indicated by one-dot-and-dash lines, and the lead wires 28 are connected to a resistance detection circuit 29 such as an ohm meter.

With the throw-away tip 1 mounted in the pocket 21, the resistance of the sensor line 12 provided on the corner portion 10 currently used for cutting can be measured by means of the detection circuit 29.

When the throw-away tip 1 is mounted in the pocket 21, the seat face 6 of the throw-away tip 1 is almost entirely brought into intimate contact with the tip seat 22. Therefore, even if the cutting fluid (water or oil) is applied to the distal end portion of the holder 20 or slugs cut by the throw-away tip 1 are scattered around the throw-away tip 1 during the cutting process, the cutting fluid and the slugs do not intrude between the tip seat 22 and the seat face 6 kept in intimate contact with each other. That is, the seat face 6 of the throw-away tip 1 and the tip seat 22 are protected from the cutting fluid and the slugs. Therefore, the electrical connection between the probes 26, 27 provided on the tip seat 22 and the contact regions 13, 14 provided on the seat face 6 is properly maintained.

Further, the probes 26, 27 and the lead wires 28 connected thereto are provided within the holder 20.

The holder 20 shown in FIG. 5 is merely illustrative, and a holder disclosed in a prior application (Japanese Patent Application No. 11-277548 (1999)) filed by the applicant of the present invention, for example, may be used as the holder to which the throw-away tip 1 according to this embodiment is mounted.

FIGS. 6A, 6B, 6C, 6D an 6E ar pla views an front views (front side views) illustrating various configurations of throw-away tips to which the present invention is applicable.

Figure 6A:
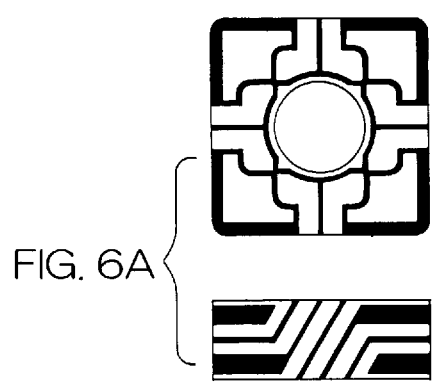
FIGS. 6A to 6E are plan views and front views illustrating various configurations of throw-away tips to which the present invention is applicable.

FIG. 6A illustrates the throw-away tip having the base of a generally square plan shape described with reference to FIG. 1.

Figure 6B:
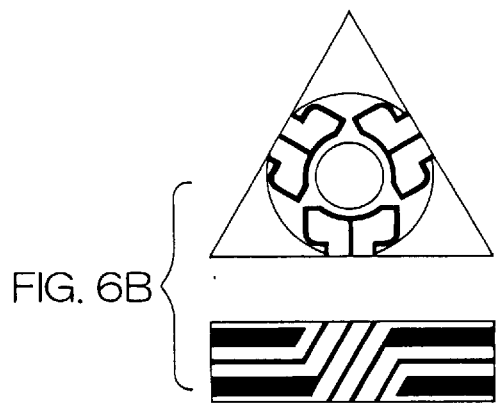

FIG. 6B illustrates a throw-away tip having a base of an equilateral triangular shape. The tip has three corner portions on each of the upper and lower sides thereof for use in cutting. That is, a total of six corner portions are provided, on which sensor lines are respectively provided. Pairs of contact regions for the respective sensor lines are provided on the seat faces.

Figure 6C:
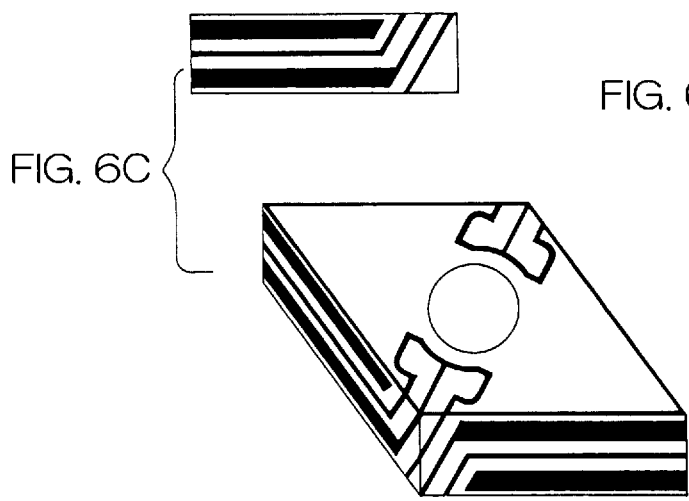

FIG. 6C illustrates a throw-away tip having a base of a rhombic plan shape. In the throw-away tip shown in FIG. 6C, two pairs of diagonally opposite acute-angle corner portions are used for cutting.

Figure 6D:
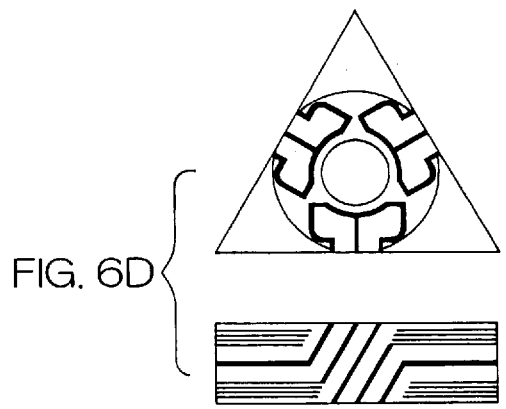

FIG. 6D illustrates a throw-away tip having a base of an equilateral triangular shape as in FIG. 6B. The throw-away tip of FIG. 6D has a sensor line including a plurality of sensor lines as in FIG. 4.

Figure 6E:
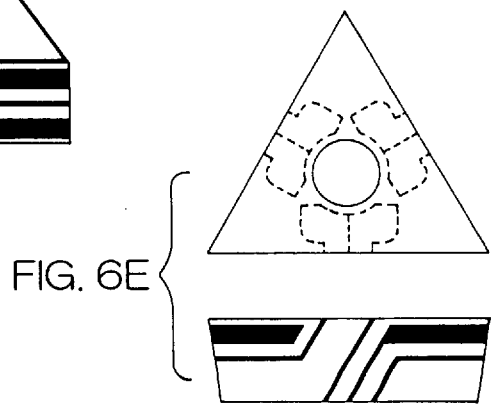

FIG. 6E illustrates a throw-away tip of so-called positive type wherein only one side thereof is used for cutting. Upper and lower surfaces of the tip serve as a rake face and a seat face, respectively, so that the tip cannot be vertically inverted for use. Three corner portions on the upper side are used for cutting and, therefore, are respectively provided with sensor lines. Further, pairs of contact regions are provided on the seat face on the lower side, and pairs of connection lines are provided on flanks on the side faces.

The present invention is applicable, for example, to throw-away tips having a round or oval plan shape as well as the throw-away tips of the aforesaid configurations.

An explanation will next be given to materials and formation methods for the base, the sensor lines, the contact regions, the connection lines and the like of the throw-away tip according to the present invention.

(1) Materials for the Base

Exemplary materials for the base of the throw-away tip include sintered alumina based materials, sintered silicon nitride based material, cermets, cemented carbides, sintered cubic boron nitride (cBN) based materials and sintered polycrystalline diamond (PCD) based materials.

(2) Compositions of the Base and Preparation Methods Therefor

An explanation will hereinafter be given to preferred compositions of the base and preparation methods therefor.
① Sintered alumina based material A sintered alumina based material to be herein employed consists essentially of 2 to 30 wt % of $ZrO_2$, 0.01 to 5 wt % of at least one selected from oxides of Fe, Ni and Co, the balance $Al_2O_3$ and inevitable impurities. At least one of the oxides of Fe, Ni and Co is added as a third component in a predetermined proportion to an $Al_2O_3$—$ZrO_2$ system, and the resulting mixture is highly densified by a hot isostatic sintering process, whereby the fracture toughness of the material can remarkably be improved.

The sintered alumina based material is prepared in the following manner. A powder mixture containing 10 to 20 wt % of $ZrO_2$, 0.2 to 2 wt % of at least one of the oxides of Fe, Ni and Co, the balance $Al_2O_3$ and inevitable impurities is molded into a compact, which is in turn baked at a temperature of 1400 to 1500° C. and further baked at a temperature of 1300 to 1500° C. by a hot isostatic sintering process, thereby providing a sintered material having a mechanical strength of not lower than 110 kg/mm².

As described above, at least one of the oxide of Co, Ni and Fe is present as the third component in a proportion of 0.2 to 2 wt % in the powder mixture. If the proportion is lower than 0.2 wt %, the resulting material does not have an improved fracture toughness. If the proportion is greater than 2 wt %, the resulting material has a reduced bending resistant strength.

$ZrO_2$ is preferably present in the sintered material in a proportion of 10 to 20 wt %, particularly 15 to 20 wt %. If the proportion of $ZrO_2$ is smaller than 10 wt %, a less energy is absorbed at a crack front, resulting in less improvement of the toughness. On the other hand, if the proportion of $ZrO_2$ is greater than 20 wt %, the proportion of monoclinic $ZrO_2$ (m-$ZrO_2$) in the $ZrO_2$ crystalline phase of the sintered material is increased, so that the proportion of a $ZrO_2$ portion contributory to the energy absorption at the crack front is correspondingly reduced, resulting in a reduction in the fracture toughness.

The proportion of the monoclinic $ZrO_2$ in the $ZrO_2$ crystalline phase of the sintered material is preferably not greater than 50%, particularly not greater than 30% based on the total $ZrO_2$. If the proportion of the monoclinic $ZrO_2$ is greater than 50%, the fracture toughness is remarkably reduced. Tetragonal $ZrO_2$ (t-$ZrO_2$) or cubic $ZrO_2$ (c-$ZrO_2$) is also present in the crystalline phase. When the tetragonal or cubic $ZrO_2$ is present in a proportion of not smaller than 50%, a phase transition of t-$ZrO_2$→m-$ZrO_2$ or c-$ZrO_2$→t-$ZrO_2$→m-$ZrO_2$ occurs, whereby an energy is effectively absorbed at the crack front.

In the sintered alumina based material, the $Al_2O_3$ crystals preferably have a grain diameter of not greater than 1 $\mu$m, and the $ZrO_2$ crystals preferably have a grain diameter of not greater than 1 $\mu$m, particularly not greater than 0.5 $\mu$m. If the grain diameters of these crystals are greater than these levels, the bending resistant strength is reduced.

A preparation method for the sintered alumin a based material is as follows. First, 10 to 20 wt % of $ZrO_2$ and 0.2 to 2 wt % of an oxide of Co, Ni or Fe or a compound convertible to the oxide during the sintering on an oxide basis are weighed and mixed with $Al_2O_3$ having an average grain diameter of not greater than 1 $\mu$m, and then the resulting mixture is dispersed and milled in a medium including a dispersant, distilled water and the like. After the milling, the resulting paste is molded into a compact by known molding means, and then the compact is sintered.

For the sintering of the compact, the compact is baked under a normal pressure in an atmosphere, then baked at a temperature of 1400 to 1500° C. with the use of a hot press, and further baked at a temperature of 1300 to 1500° C. by a hot isostatic sintering process.
② Sintered silicon nitride based material A sintered silicon nitride based material to be herein employed consist essentially of 85 to 95 mol % of silicon nitride, 1 to 5 mol % of an element of the Group IIIa in the periodic table on an oxide basis, and 3 to 10 mol % impurity oxygen on an $SiO_2$ basis with an aluminum compound being present in a proportion of not greater than 1 wt % on an oxide ($Al_2O_3$) basis. The amount of the impurity oxygen herein means an oxygen amount determined by subtracting the amount of oxygen incorporated in oxides of the Group IIIa element in the periodic table from the total oxygen amount in the sintered material, and the impurity oxygen is mostly attributed to impurity oxygen in a starting powdery silicon nitride material and the added silicon oxide.

If the proportion of silicon nitride is smaller than 85 mol % or the proportion of the Group IIIa element in the periodic table is greater than 5 mol % on an oxide basis, the hardness of the resulting sintered material is reduced. If the proportion of silicon nitride is greater than 96 mol % or the proportion of the Group IIIa element in the periodic table is smaller than 1 mol % on an oxide basis, a highly dense compact cannot be provided, whereby the strength of the resulting sintered material is reduced. On the other hand, if the proportion of the impurity oxygen is greater than 10 mol % on a silicon oxide ($SiO_2$) basis, the toughness and chipping resistance of the resulting sintered material is reduced. If the proportion of the impurity oxygen is smaller than 3 mol %, a highly dense compact cannot be provided, whereby the strength of the resulting sintered material is reduced. If the proportion of the aluminum compound is greater than 1 wt %, the reaction resistance to cast iron is reduced, whereby the abrasion resistance of the throw-away tip is reduced during a high speed cutting process.

A preferred composition of the sintered material is such that silicon nitride is present in a proportion of 88 to 95 mol %, the Group IIIa element in the periodic table is present in a proportion of 2 to 5 mol % on an oxide basis, and the impurity oxygen is present in a proportion of 2 to 8 mol % on a silicon oxide basis. Further, the aluminum compound is preferably present in the sintered material in a proportion of not greater than 0.5 wt %, particularly not greater than 0.3 wt %, on an oxide basis.

Examples of the Group IIIa element in the periodic table includes Y, Sc, Yb, Er, Dy, Ho and Lu, among which Er, Yb and Lu are preferred.

The sintered silicon nitride based material is constituted by a silicon nitride crystalline phase and a grain boundary phase containing the Group IIIa element, silicon, nitrogen and oxygen. It is important that the silicon nitride crystalline phase has a lattice constant of not greater than 7.606 angstroms, particularly not greater than 7.602 angstroms, along the a-axis thereof and a lattice constant of not greater than 2.910 angstroms, particularly not greater than 2.908 angstroms, along the c-axis thereof. If the lattice constants along the a-axis and the c-axis are greater than 7.606 angstroms and 2.910 angstroms, respectively, the ionicity of silicon nitride is increased, thereby reducing the bonding strength of silicon nitride. Therefore, silicon nitride readily reacts with a workpiece during the cutting process, so that the so-called diffusion abrasion of the throw-away tip is increased to reduce the abrasion resistance of the throw-away tip. The silicon nitride crystalline phase is present as β-type needle crystals which have minor diameters of 0.1 to 3 μm and an average aspect ratio (major diameter/minor diameter) of 2 to 10.

The grain boundary phase may be amorphous, but is referably crystallized. The crystalline phase is referably constituted by apatite, YAM, wal a tenite, disilicate or a monosilicate.

An element of the Group IVa, V o VI in the Periodic Table such as W, Mo, Ti, Ta, Nb or V, or a carbide, nitride or silicate thereof may be present in an appropriate amount in the sintered silicon nitride based material. Further, SiC in the form of dispersible particles or whisker may be present in an appropriate amount in the sintered silicon nitride based material to form a composite material for improvement of the characteristics of the sintered silicon nitride based material.

In production of the sintered silicon nitride based material, silicon nitride powder as a starting powdery material is used as a main component. The silicon nitride powder may be either $\alpha$-$Si_3N_4$ or $\beta$-$Si_3N_4$. The silicon nitride powder preferably has a particle diameter of 0.4 to 1.2 μm.

An oxide of a Group IIIa element in the periodic table and a silicon oxide powder are used as an additive component. These components are properly weighed, and mixed together and milled in a ball mill. The proportions of these components are controlled so that the oxide of the Group IIIa element in the periodic table and silicon oxide are present in proportions of 1 to 5 mol % and 3 to 10 mol %, respectively, in a compact before the sintering, and the aluminum compound is not added to these components but is incorporated as an impurity in the compact in a proportion of not greater than 1 wt % on an oxide basis. Silicon oxide is present in the compact in an amount which is equivalent to the amount of the impurity oxygen in the silicon nitride powder on a silicon oxide basis. Therefore, the starting composition is determined in A consideration of contamination with an aluminum component from the ball mill and the like during the milling and an oxygen content due to oxidation.

For preparation of a throw-away tip base, the powder mixture is molded into a compact, for example, by press molding, cast molding, extrusion molding, injection molding or cold isostatic molding. The compact is sintered, for example, by a hot press process, a normal pressure sintering process or a nitrogen gas pressure sintering process, followed by a hot isostatic sintering process (HIP) in which the resulting compact is baked under a high pressure, e.g., 2000 atm, or by immersing the compact in a frit bath or coating the compact with a glass seal and then subjecting the resulting compact to the HIP process for densification of the compact. If the sintering temperature is excessively high, diffusion of aluminum into the principal silicon nitride crystal phase is promoted to form a solid solution thereof, and the strength of the resulting sintered material is reduced due to excessive growth of grains. Further, the excessively high sintering temperature requires an expensive production apparatus. Therefore, the sintering is preferably performed at a temperature of 1650 to 2000° C., particularly, 1700 to 1950° C., in a non-oxidizing atmosphere containing nitrogen gas.

③ Cermet

For preparation of the cermet, a compact which comprises 70 to 90 wt % of a hard phase component consisting essentially of 50 to 80 wt % of Ti on a carbide, nitride or carbonitride basis and 10 to 40 wt % of an element of the Group VIa in the Periodic Table on a carbide basis and having an atomic ratio (nitrogen/carbon+nitrogen) of 0.4 to 0.6, and 10 to 30 wt % of a binder phase component consisting essentially of an iron group metal is put in a vacuum oven, and heated at a temperature higher than a liquid us temperature of the iron group metal while nitrogen gas is introduced therein at a pressure of 1 to 30 torr. After the oven reaches a maximum sintering temperature, the compact is baked at a reduced nitrogen gas pressure. Thus, a TiCN cermet is obtained which has a maximum case surface roughness of not greater than 3.5 μm and aporosite or not higher than A-1, and has a 1000-μm thick surface portion which has been modified to have a higher toughness and hardness than an inner portion thereof.

In the hard phase component of the TiCN cermet, Ti is present in proportio of 50 to 80 wt %, particularly 55 to 65 wt % on a carbide, nitride or carbonitride basis, and the Group VIa element in the periodic table such as W or Mo is present in a proportion of 10 to 40 wt %, particularly 15 to 30 wt % on a carbide basis.

If the proportion of Ti in the hard phase component is smaller than 50 wt %, the abrasion resistance is reduced. If the proportion of Ti is greater than 80 wt %, the sinte ability is disadvantageously reduced. The Group VIa element is generally effective to suppress the growth of grains and to improve wetability to the binder phase. If the proportion of the Group VIa element is smaller than 10 wt %, the aforesaid effects cannot be provided, so that the hard phase is roughened and the hardness and strength are reduced. If the proportion of the Group VIa element is greater than 40 wt %, the sintering becomes difficult with generation of an improper phase such as an η-phase.

In the hard phase component, Ta and Nb may additionally be present for improvement of the crater wear resistance, and nitrides, carbides and carbonitrides of Zr, V, Hf and the like may be present for improvement of resistance to plastic deformation in addition to the aforesaid elements in a total amount of 5 to 40 wt %. If the proportion is greater than 40 wt %, deterioration of the abrasion resistance and development of pores and voids are disadvantageously enhanced.

The binder phase essentially comprises an iron group metal such as Fe, Co or Ni, and may additionally comprise an element constituting the hard phase component.

In the sintered material, the hard phase component is present in a proportion of 70 to 90 wt % and the binder phase component is present in a proportion of 10 to 30 wt %.

The cermet to be used as a material for the base in the present invention is typically characterized in that the atomic ratio (nitrogen/carbon+nitrogen) in the hard phase component is in the range of 0.4 to 0.6, particularly 0.4 to 0.5. If the atomic ratio is smaller than 0.4, improvement in toughness and abrasion resistance cannot be expected. If the atomic ratio is greater than 0.6, pores and voids may be developed in the sintered material, thereby reducing the reliability of the throw-away tip.

The cermet is further characterized in that, though a great amount of nitrogen is incorporated therein, the surface of the sintered compact is very smooth with virtually no pore nor void and with a maximum surface roughness of not greater than 3.5 $\mu$m. Therefore, the throw-away tip composed of the cermet maintains improved toughness, abrasion resistance and heat resistance for an extended period and, hence, has a longer life and a higher reliability. In addition, there is no need to subject the sintered material to a polishing process, so that the sintered material can serve as a product on an "as is" basis.

For production of the TiCN cermet, a compact is first prepared which comprises 70 to 90 wt % of the hard phase component consisting essentially of 50 to 80 wt % of Ti on a carbide, nitride or carbonitride basis and 10 to 40 wt % of the Group VIa element in the periodic table on a carbide basis and having an atomic ratio (nitrogen/carbon+nitrogen) of 0.4 to 0.6, and 10 to 30 wt % of the binder phase.

More specifically, TiC, TiN and/or TiCN is used as a Ti-based powdery starting material, and WC, Mo2C and/or MoC, or a composite carbide or composite carbonitride thereof is used as a Group VIa element based material. These materials are blended to provide the aforesaid composition, and then molded into a compact by known molding means, e.g., press molding, extrusion molding, cast molding, injection molding or a cold isostatic molding.

As described above, carbides, nitrides and carbonitrides of Ta, Nb, Zr, V, Hf and the like may be added in combination. If TiC is used alone as the Ti-based material, the sinterability is reduced thereby to cause partial grain growth. Therefore, Ti(CN) is preferably used alone or in combination with TiN.

The resulting compact is put in a vacuum oven, and sintered.

More specifically, the compact is heated in a vacuum oven under a pressure of not higher than 0.5 torr, and 1- to 30-torr nitrogen gas is introduced into the vacuum oven at predetermined timing. The introduction of the nitrogen gas suppresses pyrolysis of the nitride such as TiN contained in the compact, thereby preventing development of pores and voids. The timing at which the nitrogen gas is introduced in the sintering process is particularly important. In general, the densification of the compact starts at a temperature around the liquid us temperature of the iron group metal in the course of the temperature rise. The nitrogen gas is introduced when the compact is densified by a theoretical density ratio of 5% or more with respect to the initial compact at a temperature not lower than the liquid us temperature. When the compact is densified by 5% or more, a liquid us film is formed on the surface of the compact. The introduction of the nitrogen gas after the formation of the liquid us film causes nitrogen gas to remain in interstices in the compact and, as a result, prevents the formation of pores and voids.

However, if the nitrogen gas is introduced when the theoretical density ratio exceeds 90%, the decomposition of the nitride cannot effectively be suppressed, so that the resulting sintered material is liable to have a roughened surface. Therefore, the introduction of the nitrogen gas is preferably started when the density ratio is lower than 90%.

After the temperature in the oven reaches the maximum sintering temperature, the pressure of the nitrogen gas is reduced lower than the previous level or to the vacuum, or gradually reduced for the sintering. This is because, if the pressure is further increased after the maximum sintering temperature is reached, a rough and brittle nitride layer containing little metal is formed on the surface of the sintered material, thereby resulting in roughening of the case surface and remarkable reduction of the toughness of the surface portion.

A reason why the nitrogen gas pressure is set at 1 to 30 torr is that a pressure of lower than 1 torr cannot effectively suppress the decomposition of the nitride and a pressure of greater than 30 torr reduces the sinterability and results in deposition of free carbon and reduction of the toughness of the sintered material.

Such a preparation method virtually eliminates the development of pores and voids in the sintered material to smooth the surface of the sintered material. Another characteristic feature of the preparation method of the present invention is that the very hard and tough modified surface layer is formed on the surface of the sintered material as described above.

Although a throw-away tip base of any of various shapes can be formed of the cermet, the contraction speed at the sintering is preferably controlled in accordance with the complexity of the shape of the base. This is because the compact contracts in accordance with a contraction curve which differs from part to part thereof and, if the complexity of the shape of the compact is increased, minute pores and cracks may occur on the surface of the finally obtained sintered material.

For prevention of such a phenomenon, it is necessary to reduce the contraction speed of the compact at the sintering. In this respect, an inert gas such as He or Aris preliminarily introduced at the introduction of the nitrogen gas to suppress the decomposition of the nitride and to allow the contraction of the compact to proceed moderately without deterioration of the sinterability. The inert gas is preferably introduced at a temperature lower by about 50 to 20 degrees than the nitrogen gas introduction temperature and at a pressure of not higher than 1 atm.

④ Cemented carbide

A cemented carbide to be herein employed comprises a hard phase and a binder phase. The hard phase consists essentially of tungsten carbide, or tungsten carbide of 5 to 15 wt % of which is replaced with at least one of carbides, nitrides and carbonitrides of metals of the Group VIa, Va and VIa in the Periodic Table. Where a component other than tungsten carbide is blended, the hard phase comprises a WC phase and a solid solution phase of a composite carbide or a solid solution phase of a composite nitride. The binder phase consists essentially of an iron group metal such as Co, which is present in a proportion of 5 to 15 wt % based on the total binder phase.

A preferred cemented carbide comprises a phase consisting of cobalt tungsten carbide in addition to the hard phase and the binder phase. Examples of known cobalt tungsten carbide include $CO_3W_3C$, $Co_6W_6C$, $CO_2W_4C$ and $CO_3W_9C_4$. The highest peaks observed in X-ray diffraction patterns of these cobalt tungsten carbides are a (333) and (511) composite peak for $CO_3W_3C$, a (333) and (511) composite peak for $Co_6W_6C$, a (333) and (511) composite peak for $Co_2W_4C$ and a (301) peak for $Co_3W_9C_4$. It is important that a peak intensity ratio I1/I2 is greater than zero and not greater than 0.15, preferably 0.01 to 0.10, wherein I1 is the height of the highest intensity peak in the peaks of the cobalt tungsten carbides and I2 is the height of the highest peak, i.e., the height of a (001) peak of tungsten carbide WC. A reason why the peak intensity ratio is set within the aforesaid range is as follows. If the intensity ratio is zero, the cobalt tungsten carbides do not deposit in the cemented carbide, resulting in reduction of the abrasion resistance of the base. If the intensity ratio is greater than 0.15, the cobalt tungsten carbides excessively deposit, resulting in reduction of the hardness of the cemented carbide.

The cobalt tungsten carbide phase is preferably present as a phase having an average grain diameter of not greater than 5 µm, particularly not greater than 3 µm in the cemented carbide. If the average grain diameter is greater than 5 µm, the strength of the entire cemented carbide is reduced because the cobalt tungsten carbides are intrinsically brittle. Most preferably, the average grain diameter is not greater than 2 µm.

As the cobalt tungsten carbide phase is generated, W diffuses into the Co binder phase to form a solid solution therein, so that the lattice constant of Co changes. The lattice constant of Co in the cemented carbide is preferably in the range of 3.55 to 3.58.

For preparation of the cemented carbide, a powdery WC starting material, one or more powdery materials selected from the carbides, nitrides and carbonitrides of the metals of the Groups IVa, Va and VIa in the periodic table, and Co powder are respectively weighed in the aforesaid amounts, mixed together and milled. The resulting powder mixture is molded into a compact by a known molding method such as press molding, and the resulting compact is sintered.

The sintering is performed in vacuum under a pressure of $10^{-1}$ to $10^{-3}$ torr in a temperature range between 1623 and 1773 K for 10 minutes to 2 hours. The deposition of the cobalt tungsten carbides is controlled by properly determining the total amount of carbon including the amount of carbon in the starting material and the amount of additional carbon powder, and the amount of the additional carbides, nitrides and carbonitrides of the metals of the Groups IVa, Va and VIa which are to be substituted for some of tungsten carbide. Where the amount of the carbon in the starting material to be used is lower than a stoichiometric amount, for example, the deposition easily occurs.

The deposition of a very small amount of the cobalt tungsten carbides in the cemented carbide makes it possible to impart an excellent cutting ability to the throw-away tip particularly for cutting stainless steel. The cobalt tungsten carbides per se are very hard and, therefore, excellent in abrasive resistance. Further, a reduced amount of carbon are diffused into the binder phase to form a solid solution and the amount of tungsten is correspondingly reduced as the cobalt tungsten carbides are generated, whereby the binder phase is strengthened. In addition, the generated cobalt tungsten carbides have different expansion coefficients from that of the WC phase occupying a major portion of the cemented carbide, so that residual compressive stress occurs therein to improve the chipping resistance.

(3) Conductive Film for the Sensor Lines and the Like

The sensor lines to be formed on the flanks of the base of the throw-away tip have a predetermined electrical resistance. A change in the electrical resistance is measured by means of an ohm meter to detect the abrasion and chipping of the throw-away tip.

Examples of a material for the sensor lines include: metallic materials including metals of the Groups IVa, Va and VIa such as Ti, Zr, V, Nb, Ta, Cr, Mo and W, iron group metals such as Co, Ni and Fe, and Al; carbides, nitrides and carbonitrides of the metals of the Groups IVa, Va and VIa such as TiC, VC, NbC, TaC, $Cr_3C_2$, $MO_2C$, WC, $W_2C$, TiN, VN, NbN, TaN, CrN, TiCN, VCN, NbCN, TaCN and CrCN; and (Ti,Al)N.

Among these materials, TiN is preferable for the following reasons. TiN has good adhesion to the base of the throw-away tip. TiN is nonreactive with a workpiece and the sensor lines of TiN constantly exhibit a predetermined electrical resistance, so that the abrasion and chipping of the throw-away tip can accurately be detected. TiN effectively prevents a work surface of a workpiece from being scratched by a reaction product thereof. TiN has an excellent acid resistance, so that the electrical resistance of the sensor lines is hardly changed by generation of an oxide. Therefore, the abrasion and chipping of the throw-away tip can accurately be detected.

The sensor lines are formed in the following manner. A conductive film of a predetermined thickness is formed on the flanks of the base of the throw-away tip by a CVD method, a PVD method such as ion plating, sputtering or evaporation, or a plating method. Thereafter, the conductive film is patterned into a predetermined configuration by laser machining or etching.

More specific methods for forming the sensorlines are as follows.

Where the sensor lines are formed of TiN by the CVD method, for example, the base of the throw-away tip is put in a reaction vessel of a heat resistant alloy which is condition at a temperature of 900° C. to 1050° C. and at a pressure of 10 to 100 kPa. Then, $TiCl_4$, $H_2$ and $N_2$ are introduced into the reaction vessel at flow rates of 1 to 5 ml/min, 20 to 30 l/min and 10 to 20 l/min, respectively, for 20 minutes to provide a reaction product of TiN and HCl, whereby the base of the throw-away tip is coated with TiN.

Where the sensor lines are formed of (Ti,Al)N or (Ti,Al)CN by ion plating which is one kind of the PVD method, for example, the base of the throw-away tip and a cathode electrode (target) of a Ti—Al alloy are placed in an arc ion plating apparatus. After the inside of the apparatus is heated up to 500° C. under vacuum at $1\times10^{-5}$ torr, Ar gas is introduced into the apparatus to create an Ar atmosphere of $1\times10^{-3}$ torr. Then, a bias voltage of −800V is applied to the base in this state, whereby the surface of the base is subjected to gas bombard cleaning. Finally, nitrogen gas or nitrogen gas plus methane gas as a reaction gas is introduced into the apparatus to create a reaction atmosphere at $5\times10^{-3}$ torr, and the bias voltage applied to the base is reduced to −200V to cause arc discharge between the cathode electrode and an anode electrode. The Ti–Al alloy freed from the cathode electrode is allowed to react in the reaction atmosphere, whereby the base is coated with (Ti,Al)N or (Ti,Al)CN.

The conductive film of TiN, (Ti,Al)N, (Ti,Al)CN or the like formed on the surface of the base of the throw-away tip is patterned into a predetermined configuration for formation of the sensor lines, the contact regions, the connection lines and the like by laser machining or etching. Where the laser machining is employed for the patterning, for example, a YAG laser beam having a width of 50 μm, a wavelength of 1.06 μm and an output of 35 kHz and 10 A is scanned over the TiN film or the like formed on the surface of the base at a drawing speed of 100 to 300 mm/s. Alternatively, a $CO_2$ laser having an illumination spot diameter of 0.3 mm and an output of 20 W is scanned over the TiN film at a drawing speed of 0.3 m/min.

If the conductive film is thin with a thickness of less than 0.05 μm, the adhesion of the conductive film to the surface of the base is poor and the electrical resistance of the sensor line is increased, so that it may be difficult to accurately detect the abrasion and chipping of the throw-away tip. If a conductive film having a thickness of greater than 20 μm is to be formed, a great internal stress occurs inside the conductive film at the formation thereof, whereby the conductive film may have poor adhesion to the surface of the base. Therefore, the thickness of the conductive film is preferably in the range of 0.05 to 20 μm, most preferably 0.1 to 5 μm.

Where the base of the throw-away tip is composed of an insulative material such as a sintered alumina based material, a sintered silicon nitride based material or cBN, the sensor lines and the like are formed directly on the surface of the base. Where the base is composed of a conductive material such as a cemented carbide or a cermet, an intermediate layer of an insulative material such as alumina intervenes between the sensor lines and the base.

The intermediate layer of an insulative material such as alumina serves for electrical isolation of the sensor lines and the like. The intermediate layer which has a predetermined thickness is formed between the surface of the base and the sensor lines and the like (conductive film) by a CVD method or the like.

More specifically, where the intermediate layer is composed of alumina, the formation of the intermediate layer is achieved in the following manner. The base of the throw-away tip is placed in a reaction vessel of a heat resistant alloy which is condition at a temperature of about 1050° C. and at a pressure of 6.5 kPa. Then, $H_2$, $CO_2$ and $AlCl_3$ are introduced into the reaction vessel at flow rates of 40 to 50 l/min, 1 to 3 l/min and 0.5 to 2 l/min, respectively, for two hours to generate $Al_2O_3$, whereby the base is coated with $Al_2O_3$.

If the intermediate layer has a thickness of less than 1 μm, electrical short may occur between the base and the sensor lines, so that the abrasion and chipping of the throw-away tip cannot accurately be detected. If an intermediate layer having a thickness of greater than 10 μm is to be formed, a great internal stress occurs inside the intermediate layer at the formation thereof, whereby the intermediate layer may have poor adhesion to the surface of the base. Even with application of a small external force, the intermediate layer may readily be separated from the surface of the base. Therefore, the thickness of the intermediate layer is preferably in the range of 1 μm to 10 μm.

Next, examples of the throw-away tip with the abrasion sensor according to the present invention will be described which are adapted for detection of abrasion.

EXAMPLE 1

A base of a throw-away tip was formed of a sintered alumina based material, and sensor lines were formed of a conductive film of TiN in a configuration as shown in FIG. 1 on the base. The sensor line had a thickness of 0.3 μm and a width of 0.186 mm. The throw-away tip with the abrasion sensor was attached to the holder shown in FIG. 5. Then, a round rod workpiece of SCM435 (chromium molybdenum steel) was sequentially cut under the following machining conditions on an NC machine tool, while the resistance of the sensor line was measured. The result is shown in FIG. 7.

Machining conditions:

| | |
|---|---|
| Cutting speed | v = 200 m/min |
| Cutting depth | d = 2 mm |
| Feed | f = 0.2 mm/rev |
| Wet machining | |
| Workpiece | Round rod of SCM435 (chromium molybdenum steel) |

Figure 7:
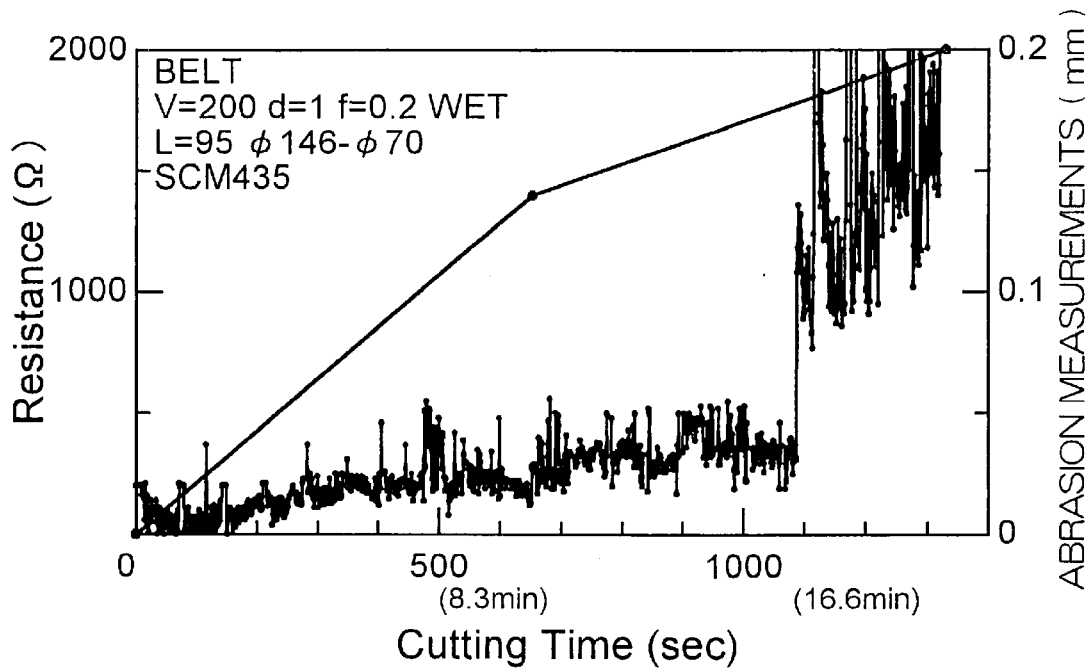
FIG. 7 is a graph showing the results of a test performed in Example 1.

In FIG. 7, a jaggy line graph illustrates changes in the resistance thus measured, wherein the resistance and the time are plotted as the ordinate and the abscissa, respectively. The graph shows that the resistance steeply increased after the lapse of 16.6 minutes from the start of the machining. For reference, the abraded states (abrasion widths) of the cutting edge were measured after the lapse of 11 minutes and 18 minutes from the start of the machining, and plotted to form a line graph, which shows a change in the abrasion width at a cutting front over time.

This measurement shows that, when the resistance steeply increased after the lapse of 16.6 minutes from the start of the machining, the abrasion reached the sensor film width (0.186 mm). Thus, a time point at which the abrasion reached the allowable abrasion limit can definitely be detected.

EXAMPLE 2

Figure 8:
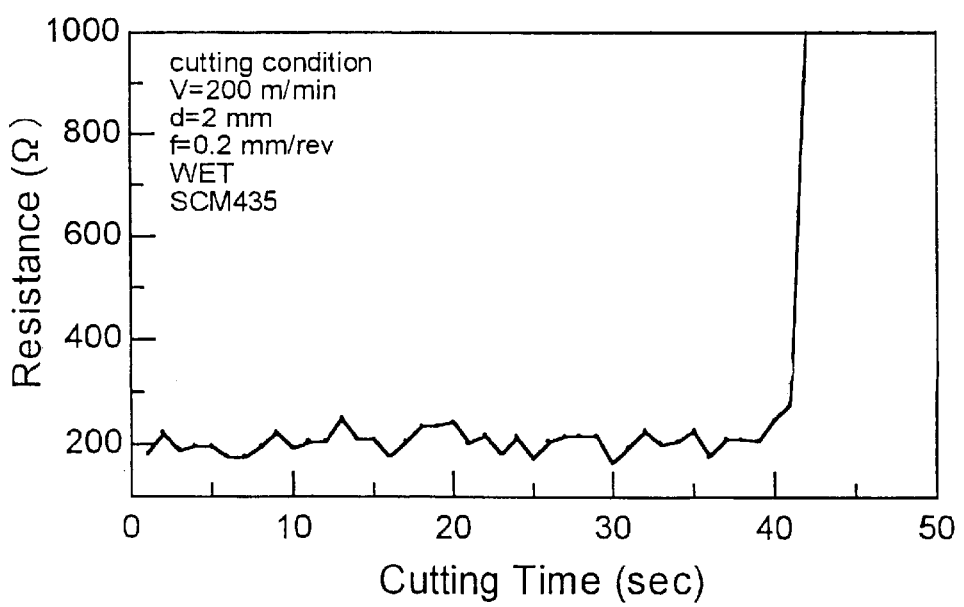
FIG. 8 is a graph showing the results of a test performed in Example 2.

A throw-away tip as employed in Example 1 was attached to the holder shown in FIG. 5. Then, a round rod workpiece of SCM435 (chromium Molybdenum steel) having four grooves was sequentially cut under the following conditions on an NC machine tool, while the resistance of a sensor line was measured. The result is shown in FIG. 8.

Machining conditions:

| | |
|---|---|
| Cutting speed | v = 200 m/min |
| Cutting depth | d = 2 mm |
| Feed | f = 0.2 min/rev |
| Wet machining | |
| Workpiece | Round rod of SCM435 (chromium molybdenum steel) with four grooves |

After the lapse of 40 odd seconds, the resistance steeply increased to infinity. The machining was interrupted to check a cutting ridge of the throw-away tip, and it was found that the cutting ridge was chipped. This experiment shows that, when the cutting ridge was chipped to be unusable, the sensor line was cut off. As a result, the chipping of the cutting ridge of the throw-away tip can definitely be detected on the basis of the abnormal change in the resistance thus measured.

EXAMPLE 3

Figure 9:
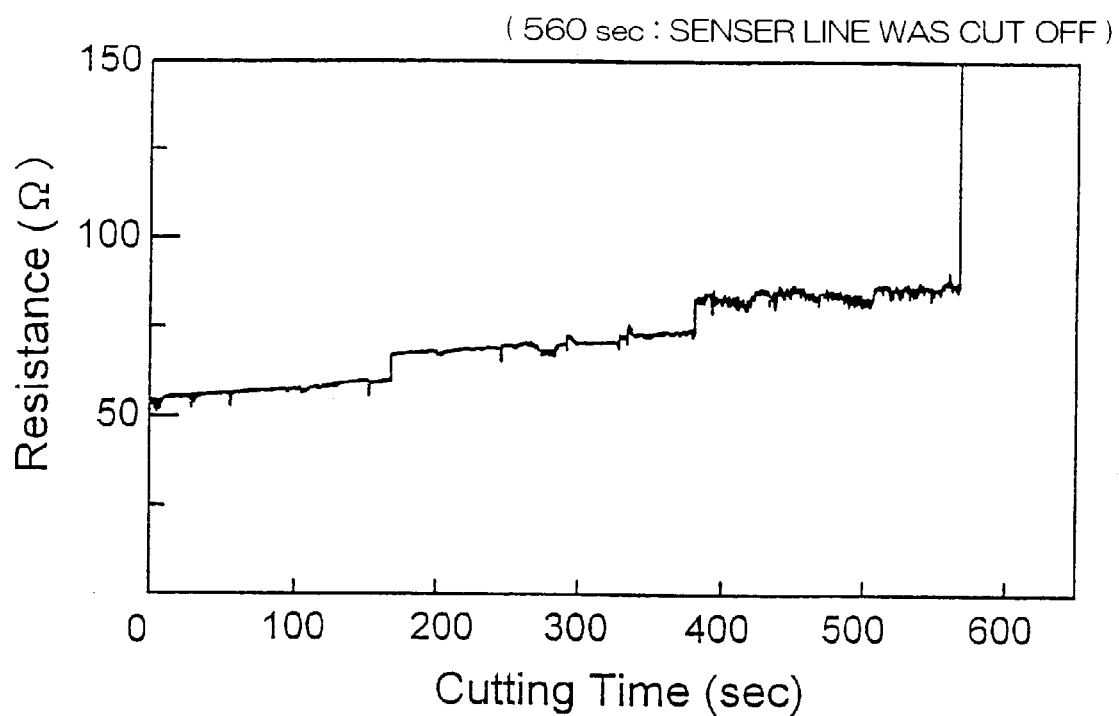
FIG. 9 is a graph showing the results of a test performed in Example 3.

A base of a throw-away tip was formed of a sintered silicon nitride based material, and three parallel sensor lines were formed of a conductive film of TiN in a configuration as shown in FIG. 4 on the base. The sensor lines each had a thickness of 0.3 μm and a width of 0.146 mm. Each adjacent pair of sensor lines were spaced 0.01 mm. The throw-away tip with the abrasion sensor was attached to the holder shown in FIG. 5. Then, a round rod workpiece of FC250 (gray cast iron) was sequentially cut under the following machining conditions on an NC machine tool, while the resistance of the sensor lines was measured. The result is shown in FIG. 9.

Machining conditions:

| | |
|---|---|
| Cutting speed | v = 200 m/min |
| Cutting depth | d = 2 mm |
| Feed | f = 0.2 mm/rev |
| Wet machining | |
| Workpiece | Round rod of FC250 (gray cast iron) |

The measured resistance increased stepwise over the machining time, and finally reached infinity. As the abrasion of the tip proceeded, the respective sensor lines were successively cut off, whereby the resistance increased stepwise. When the third sensor line was cut off (after the lapse of about 10 minutes), the resistance increased to infinity. Thus, a time point at which all the sensor lines were worn out and the cutting edge of the throw-away tip reached the allowable abrasion limit can be detected.

While the present invention has thus been described in detail by way of the specific embodiments thereof, it should be understood that the invention be not limited to the embodiments, but various modifications may be made within the scope of the invention defined by the following claims.

What is claimed is:

1. A throw-away tip with an abrasion sensor, comprising:
   a generally planar base having a rake face defined by one of opposite surfaces thereof, a seat face defined by the other surface thereof opposite from the rake face, and a flank defined by a side face thereof intersecting the rake face and the seat face;
   a cutting ridge defined by an intersection between the rake face and the flank;
   a sensor line of a conductive film provided along the cutting ridge on the flank in an electrically insulative relation with respect to the base;
   a pair of contact regions provided on the seat face in an electrically insulative relation with respect to the base, the contact regions being electrically connectable to a predetermined circuit; and
   a pair of connection lines provided on the base in an electrically insulative relation with respect to the base and respectively connecting the pair of contact regions to opposite ends of the sensor line, one of the pair of connection lines including a return line spaced a predetermined distance from the sensor line in a parallel relation to the sensor line.

2. A throw-away tip as set forth in claim 1, wherein the connection lines each have a greater width than the sensor line.

3. A throw-away tip as set forth in claim 1, wherein a side edge of the sensor line away from the cutting ridge extends parallel to the cutting ridge and is spaced from the cutting ridge by a distance predetermined in relation to abrasion of the flank.

4. A throw-away tip as set forth in claim 3, wherein the predetermined distance conforms to the life of the cutting ridge which is expired by abrasion of the flank.

5. A throw-away tip as set forth in claim 4,
   wherein the base is composed of an insulative material,
   wherein a surface of the base is almost entirely covered with a conductive film,
   wherein the sensor line, the connection lines and the contact regions are formed by electrically separating the conductive film on the surface.

6. A throw-away tip as set forth in claim 4,
   wherein the base is composed of a conductive material,
   wherein a surface of the base is almost entirely covered with a nonconductive film on which a conductive film is formed,
   wherein the sensor line, the connection lines and the contact regions are formed by electrically separating the conductive film on the surface.

7. A throw-away tip as set forth in claim 2,
   wherein the base has a plurality of side faces, which respectively define flanks,
   wherein a cutting corner portion is defined by an intersection between the rake face and each adjacent pair of flanks,
   wherein the sensor line extends along the cutting ridge as surrounding the corner portion and the return line extends parallel to the sensor line as surrounding the corner portion.

8. A throw-away tip as set forth in claim 7, wherein the pair of connection lines except the return line extend parallel to each other at a predetermined inclination angle with respect to the sensor line on the flank.

9. A throw-away tip as set forth in claim 8, comprising
   a plurality of corner portions, a plurality of sensor lines for the respective corner portions, plural pairs of connection lines connected to the respective sensor lines, and plural pairs of contact regions,
   wherein electrical conduction paths including the sensor lines, the pairs of connection lines and the pairs of contact regions are arranged in the same pattern.

10. A throw-away tip with an abrasion sensor, comprising:
   a generally planar base having a rake face defined by one of opposite surfaces thereof, a seat face defined by the other surface thereof opposite from the rake face, and a plurality of flanks defined by a plurality of side faces thereof intersecting the rake face and the seat face;
   a plurality of cutting ridges respectively defined by intersections between the rake face and the flanks;
   N cutting corner portions, each defined by an intersection between the rake face and an adjacent pair of flanks, wherein N is a natural number not less than 2;
   sensor lines of a conductive film respectively provided along the cutting ridges on the N corner portions in an electrically insulative relation with respect to the base to surround the corner portions;
   N pairs of contact regions provided on the seat face in an electrically insulative relation with respect to the base, the contact regions being electrically connectable to a predetermined circuit; and N pairs of connection lines provided on the base in an electrically insulative relation with respect to the base and respectively connecting the N pairs of contact regions to opposite ends of the sensor lines on the N corner portions.

11. A throw-away tip as set forth in claim 10, which is a double-sided tip such that, where one of the opposite surfaces of the base serves as the rake face, the other surface serves as the seat face and, where the other surface serves as the rake face, the one surface serves as the seat face, wherein the N corner portions are provided on each of opposite sides of the base, wherein the N pairs of contact regions are provided on each of the opposite surfaces.

12. A throw-away tip as set forth in claim 11, wherein one of the contact regions in each of the N pairs is electrically isolated while the other contact regions in the N respective pairs are electrically connected together.

13. A throw-away tip as set forth in claim 12, wherein the N pairs of contact regions on the one surface of the throw-away tip and the N pairs of contact regions on the other surface are arranged in the same configuration.

14. A throw-away tip as set forth in claim 13, wherein the connection lines extend over the flanks and the seat face, and portions of the connection lines on the flanks are inclined at a predetermined inclination angle with respect to the sensor lines.

15. A throw-away tip as set forth in claim 14, wherein connection lines are arranged symmetrically about center of each of the flanks.

\* \* \* \* \*